F. C. HANKER.
SYSTEM OF REGULATION.
APPLICATION FILED MAY 4, 1916.
1,306,894.
Patented June 17, 1919.
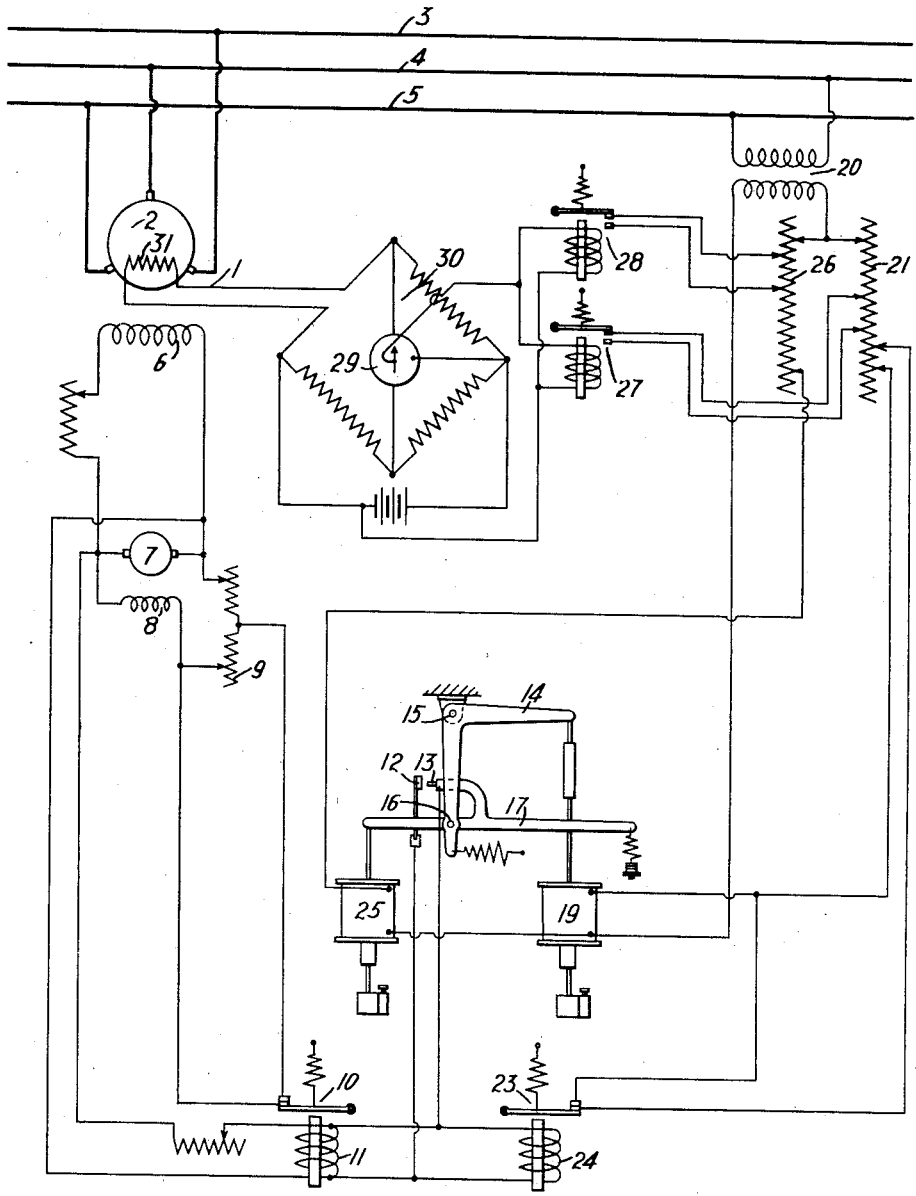
WITNESSES:
Fred A. Lind.
Otto S. Schaiver.
INVENTOR
Frederic C. Hanker
BY
Wesley G. Carr
ATTORNEY

UNITED STATES PATENT OFFICE.

FREDERIC C. HANKER, OF WILKINSBURG, PENNSYLVANIA, ASSIGNOR TO WESTINGHOUSE ELECTRIC AND MANUFACTURING COMPANY, A CORPORATION OF PENNSYLVANIA.

SYSTEM OF REGULATION.

1,306,894.  Specification of Letters Patent.  Patented June 17, 1919.

Application filed May 4, 1916. Serial No. 95,321.

*To all whom it may concern:*

Be it known that I, FREDERIC C. HANKER, a citizen of the United States, and a resident of Wilkinsburg, in the county of Allegheny and State of Pennsylvania, have invented a new and useful Improvement in Systems of Regulation, of which the following is a specification.

My invention relates to those electrical systems in which regulators are employed for controlling the field strengths of dynamo-electric machines, and it has for its object to provide means for controlling the operation of a regulator in accordance with the temperature of the dynamo-electric machine.

It is frequently desirable to so control the operation of a regulator for a dynamo-electric machine, and particularly when it is employed in connection with a synchronous condenser for the purpose of regulating the voltage at the receiving end of a distributing circuit, that the machine may not be indefinitely overloaded and damaged by excessive heat, while, at the same time, it should be permitted to assume temporary overloads so long as it is not thereby excessively heated. According to the present invention, the regulator is rendered ineffective to cause a further increase in the field excitation of the dynamo-electric machine when the temperature of the machine exceeds a predetermined value, or rather to regulate to maintain a lower voltage corresponding in value to the temperature of the machine.

In the single figure of the accompanying drawing which diagrammatically illustrates an electrical system embodying my invention, a dynamo-electric machine 1, that may be a synchronous condenser or a generator, has its armature 2 connected to a distributing circuit 3—4—5, its field-magnet winding 6 being supplied with exciting current from an exciter having an armature 7 and a field-magnet winding 8. In series with the exciter field-magnet winding 8 is a resistor 9 the effective value of which is controlled by a relay 10 that is adapted to open and close a circuit in shunt thereto. The relay 10 is provided with an actuating winding 11 that receives current from the exciter or from any other suitable source, and a circuit in shunt thereto is controlled by stationary and movable contact members 12 and 13 that constitute parts of the main control element of a regulator.

The said main control element comprises further a bell-crank lever 14 that has a stationary fulcrum at 15 and supports and provides a fulcrum at 16 for a second lever 17 having an upwardly and laterally-extending arm that carries the contact terminal 13. The lever 14 is actuated by an electromagnet having a winding 19 that receives current from the distributing circuit 3—4—5 through a transformer 20 and a resistor 21. The effective value of the resistor 21 is controlled by a relay 23 having an actuating winding 24 that is connected in parallel with the relay winding 11, and is also controlled by the contact terminals 12 and 13. The engagement and disengagement of the contact terminals 12 and 13 causes the relay 23 to open and close a shunt to a portion of the resistor 21, thereby causing alternate increases and decreases in the degree of energization of the winding 19 which, accordingly, vibrates the lever 14 and with it the contact terminal 13. The lever 17 is actuated by an electromagnet having an energizing winding 25 that receives current proportional in value to the voltage of the circuit 3—4—5 through the transformer 20 and a resistor 26.

The effective values of the resistors 21 and 26 are controlled by two relays 27 and 28, respectively, having actuating windings the circuits of which are controlled by a galvanometer or relay 29 that is connected between two corners of a Wheatstone bridge 30, the resistor 31, constituting one side or leg thereof, being embedded in the structure of the dynamo-electric machine 1, or being otherwise located in proximity to the part or parts of the machine that are most likely to become overheated when an excessive load is applied.

In the operation of the system, the voltage regulator serves, as is usual with regulators of this type, to so vary the field strengths of the exciter and the dynamo-electric machine as to maintain the voltage upon the circuit 3—4—5 substantially uniform. For instance, if the voltage of the circuit 3—4—5 decreases because of an increase in the load, the winding 25 becomes less strongly energized, and the contact terminal 13 is thereby moved toward, or into engagement with, the terminal 12. Upon engagement of the contact terminals, the relay windings 11 and 24 are short-circuited and, consequently, the resistor 9 and a part of the resistor 21 are likewise short-circuited. The field strengths of the exciter and of the generator or synchronous condenser are thereby increased to effect an increase in the voltage of the dynamo-electric machine and of the distributing circuit. The winding 19 also becomes more strongly energized, and, accordingly, moves the contact terminal 13 away from the terminal 12. The operation of the regulator is, of course, opposite to that just described when there is a tendency for the voltage 3—4—5 to increase above its normal value. The contact terminal 13 is vibrated in this manner into and out of engagement with the terminal 12, with the result that the voltage upon the distributing circuit is maintained substantially uniform.

If the load upon the circuit 3—4—5 is excessive, the regulator will, of course, operate to so increase the field strength of the dynamo-electric machine 1 as to enable it to carry the load or to assist in carrying it. In the case of a synchronous condenser, this is, of course, the wattless part of the load. However, if the excessive load persists for such a period as to cause excessive heating of the dynamo-electric machine, an unbalanced condition is established in the Wheatstone bridge as a result of which the relay 29 operates to close the circuits of the relays 27 and 28 which thereupon short circuit portions of the resistors 21 and 26. The result is that the windings 19 and 25 of the regulator become more strongly energized and operate to cause a decrease in the field strengths of the exciter and of the dynamo-electric machine, and, consequently, the dynamo-electric machine is prevented from assuming as large a proportion of the load as was previously carried by it, and the machine is thereby prevented from being damaged by excessive heating.

It will, of course, be understood that other specific means than that illustrated may be employed for governing the operation of the regulator to prevent excessive heating of the dynamo-electric machine, and also that other forms of regulators may be employed, if desired, without departing from the spirit and scope of the invention, as set forth in the appended claims.

I claim as my invention:

1. The combination with a dynamo-electric machine, and means for regulating its field strength comprising an actuating winding and a resistor in series therewith, of means for modifying the effectiveness of the resistor when the temperature of the dynamo-electric machine exceeds a predetermined value by reason of an abnormal current flow through the machine for a protracted period.

2. The combination with a dynamo-electric machine, a Wheatstone bridge comprising a resistor located in the dynamo-electric machine, and a relay connected between two of the corners of the Wheatstone bridge, of means for regulating the field strength of the dynamo-electric machine and affected in its operation by the said relay.

3. The combination with a dynamo-electric machine, a Wheatstone bridge comprising a resistor located in the dynamo-electric machine, and a relay connected between two of the corners of the Wheatstone bridge, of means for regulating the field strength of the dynamo-electric machine comprising an actuating winding and a resistor in series therewith, the said relay controlling the degree of effectiveness of said resistor.

4. The combination with a dynamo-electric machine provided with separate exciting means, of a voltage regulator arranged to control the output electromotive force of said dynamo-electric machine through the control of said exciting means, and means comprising a thermal element for impressing a false excess voltage upon said regulator when a predetermined current overload is imposed upon said dynamo-electric machine for a predetermined protracted period.

5. The combination with a dynamo-electric machine provided with exciting means, of a voltage regulator of the vibratory type arranged to control the output electromotive force of said dynamo-electric machine through the control of said exciting means, means for impressing only a predetermined portion of the output electromotive force of said dynamo-electric machine upon the actuating magnets of said regulator under normal load conditions, and means for impressing a greater portion of said output electromotive force upon said magnets if the internal temperature of said dynamo-electric machine exceeds a predetermined value by reason of an abnormal current flow through the machine for a predetermined protracted period.

In testimony whereof I have hereunto subscribed my name this 17th day of April, 1916.

FREDERIC C. HANKER.